United States Patent
Li et al.

(10) Patent No.: US 9,041,672 B2
(45) Date of Patent: May 26, 2015

(54) METHODS AND DEVICES FOR FLIPPING PAGES OF ELECTRONIC DATA AND ELECTRONIC APPARATUSES USING THE SAME

(71) Applicant: MediaTek Singapore Pte. Ltd., Singapore (SG)

(72) Inventors: Yajun Li, Beijing (CN); Chin-Ying Hsieh, New Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 142 days.

(21) Appl. No.: 13/799,897

(22) Filed: Mar. 13, 2013

(65) Prior Publication Data

US 2013/0257766 A1    Oct. 3, 2013

(30) Foreign Application Priority Data

Mar. 31, 2012 (CN) .......................... 2012 1 0101455

(51) Int. Cl.
*G06F 3/0488* (2013.01)
*G06F 3/0483* (2013.01)
*G06F 3/0485* (2013.01)

(52) U.S. Cl.
CPC ............ *G06F 3/0488* (2013.01); *G06F 3/0483* (2013.01); *G06F 3/0485* (2013.01)

(58) Field of Classification Search
None
See application file for complete search history.

(56) References Cited

U.S. PATENT DOCUMENTS

| | | | | |
|---|---|---|---|---|
| 6,064,384 A | * | 5/2000 | Ho ................................ | 715/839 |
| 7,737,955 B2 | * | 6/2010 | Hsieh et al. .................... | 345/173 |
| 2007/0247441 A1 | * | 10/2007 | Kim et al. ...................... | 345/173 |
| 2012/0038582 A1 | * | 2/2012 | Grant ............................ | 345/174 |
| 2012/0066591 A1 | * | 3/2012 | Hackwell ...................... | 715/702 |
| 2012/0124505 A1 | * | 5/2012 | St. Jacques, Jr. ............... | 715/776 |
| 2012/0311438 A1 | * | 12/2012 | Cranfill et al. ................. | 715/256 |
| 2013/0021281 A1 | * | 1/2013 | Tse et al. ....................... | 345/173 |
| 2013/0120302 A1 | * | 5/2013 | Kang et al. .................... | 345/173 |
| 2013/0222264 A1 | * | 8/2013 | Shirzadi et al. ............... | 345/173 |
| 2013/0257766 A1 | * | 10/2013 | Li et al. ......................... | 345/173 |

* cited by examiner

*Primary Examiner* — Peter Vincent Agustin
(74) *Attorney, Agent, or Firm* — McClure, Qualey & Rodack, LLP

(57) ABSTRACT

A method and device for flipping pages of electronic data and an electronic apparatus using the same are provided. According to the method, a touched position is detected when the touch panel is touched. The number of pages of electronic data to be flipped is determined according to the touched position. According to the method and device for flipping pages of electronic data and the electronic apparatus, users can achieve the page flipping with different numbers of pages to be flipped by performing the touch operation once.

24 Claims, 7 Drawing Sheets

METHODS AND DEVICES FOR FLIPPING PAGES OF ELECTRONIC DATA AND ELECTRONIC APPARATUSES USING THE SAME

CROSS REFERENCE TO RELATED APPLICATIONS

This Application claims priority of China Patent Application No. 201210101455.3, filed on Mar. 31, 2012, the entirety of which is incorporated by reference herein.

BACKGROUND OF THE INVENTION

1. Field of the Invention

The invention relates to processing technique for electronic data, and more particularly to a method and device for flipping pages of electronic data and an electronic apparatus using the same.

2. Description of the Related Art

Currently, since more electronic devices can be used for information searches, touch panels have become a popular topic of discussion. Except the application for information search, touch panels are durable, easy to control, have a fast response time, and take up very little space. Through the use of touch panels, users perform operations on electronic devices by using their fingers to lightly touch icons or words shown on the displays of the electronic devices, such that the communication between electronic devices and users is direct and easy. Presently, touch panels are widely used in different applications: control operating systems in factory equipment for an industrial purpose, electronic search devices used for public information, automatic teller machines for a commercial purpose, and consumer electronic products, such as portable phones and digital cameras.

However, for a current electronic device using a touch panel, such as a portable phone, an e-book, an electronic dictionary, a digital camera, a tablet computer, or a phone book supporting a flipping function, when the electronic device provides information-search and reading functions to a user, the electronic device allows only one page to be flipped when the user touches the touch panel once. The user cannot selectively flip either one page or several pages by touching the touch panel only once.

BRIEF SUMMARY OF THE INVENTION

An exemplary embodiment of a method for flipping pages of electronic data based on a touch panel is provided. The method comprises the steps of: detecting a touched position when the touch panel is touched and determining the number of pages of electronic data to be flipped according to the touched position.

Another exemplary embodiment of a method for flipping pages of electronic data is provided. The method comprises the step of receiving a touched-point coordinate signal. The touched-point coordinate signal corresponds to a touched-point coordinate. The method further comprises the steps of determining the number of pages of electronic data to be flipped according to the touched-point coordinate and displaying the electronic data after page flipping is performed according to the determined number of pages to be flipped.

An exemplary embodiment of a device for flipping pages of electronic data based on a touch panel is provided. The device comprises a detection module and a determination module. The detection module is configured to detect a touched position when the touch panel is touched. The determination module is coupled to the detection module. The determination module is configured to determine the number of pages of electronic data to be flipped according to the touched position.

Another exemplary embodiment of a device for flipping pages of electronic data is provided. The device comprises a determination module and a display module. The determination module is configured to receive a touched-point coordinate signal and determine the number of pages of electronic data to be flipped according to the touched-point coordinate. The touched-point coordinate signal corresponds to a touched-point coordinate. The display module is configured to display the electronic data after page flipping is performed according to the determined number of pages to be flipped.

An exemplary embodiment of an electronic apparatus is provided. The electronic apparatus comprises the above device for flipping pages of electronic data based on a touch panel. The device performs page flipping to the electronic data of the electronic apparatus.

Another exemplary embodiment of an electronic apparatus is provided. The electronic apparatus comprises the above device for flipping pages of electronic data. The device performs page flipping to the electronic data of the electronic apparatus.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

According to the current touch panel technique, one touch enables the flipping of one page. The present invention provides embodiments in which, when a user touches a touch panel once, different numbers of pages can be flipped selectively, thus solving the problems with the current touch-panel technique. The detailed description is shown in the following.

Figure 1:
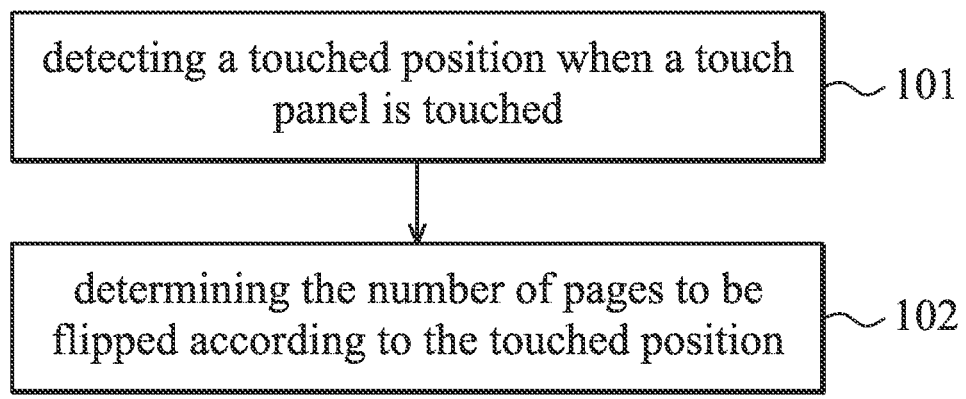
FIG. 1 is a flowchart of a method for flipping pages of electronic data according to an exemplary embodiment of the present invention.

FIG. 1 is a flowchart of a method for flipping pages of electronic data according to an exemplary embodiment of the present invention. As shown in FIG. 1, at Step 101, when a touch panel is touched, the touched position is detected. At Step 102, the number of pages to be flipped is determined according to the touched position. One skilled in the art will be aware that, according to operation principles of touch panels and mediums for information transmission, touch panels can be classified into several types, such as a resistive type, a capacitive-sensing type, an infrared type, and a surface-acoustic-wave type etc. A touch panel of the resistive type is controlled by sensing pressure. A touch panel of the capacitive-sensing type works to sense the current from the human body. A touch panel of the infrared type works to detect the position of the user's touch using infrared arrays. A touch panel of the surface-acoustic-wave type works to transfer surface acoustic waves into electronic signals by using ultrasound transmitting transducers and ultrasound receiving transducers. No matter what type a touch panel is, the touch panel usually comprises a detection module and a control module. The detection module is used to detect the position on the touch panel that is touched by a user and transmit a detection signal to the control module according to the detection result. The control module transfers the detection signal received from the detection module to a touched-point coordinate signal and then transmits the touched-point coordinate signal to portions coupled to the touch panel for processing. The touched-point coordinate signal corresponds to the touched-point coordinate. Thus, one skilled in the art can associate the touched position with the touched-point coordinate. In another embodiment, at Step 101, the touched-point coordinate signal can be received, wherein the touched-point coordinate signal corresponds to the touched-point coordinate. Then, at Step 102, the number of pages to be flipped is determined according to the touched-point coordinate. In some embodiments, the determination of the number of pages to be flipped can be achieved by the following method: dividing the touch panel into several regions, wherein the respective regions correspond to the different numbers of pages to be flipped. When the touched position is located in one of the regions, that is, one of the regions is touched, the number of pages to be flipped for the touched region is determined.

Figure 2:
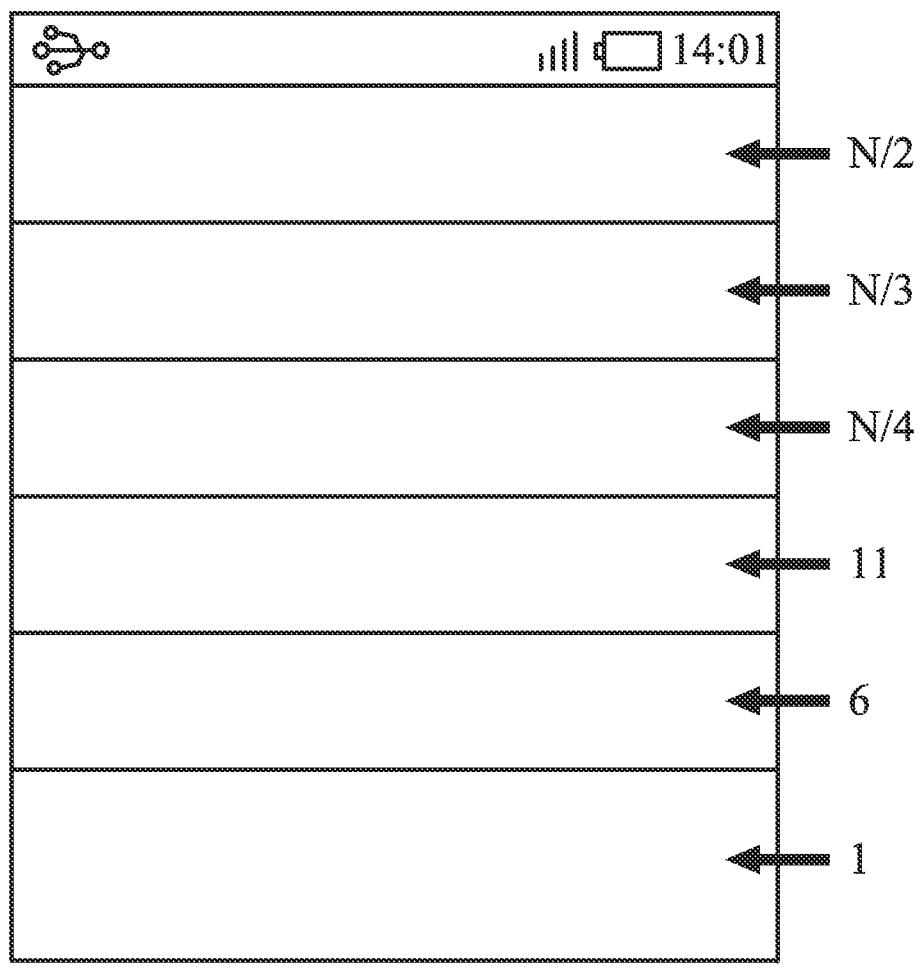
FIG. 2 is a schematic diagram illustrating a touch panel divided into several equal regions according to an exemplary embodiment of the present invention.

FIG. 2 is a schematic diagram illustrating a touch panel divided into several equal regions according to an exemplary embodiment of the present invention. As shown in FIG. 2, the touch panel is divided into 6 regions. The regions are pre-set to correspond to the different numbers of pages to be flipped.

The information corresponding to the regions and the numbers of pages to be flipped may be stored in a mapping table. For example, in cases where a user is reading an e-book on an electronic device, N represents the total number of pages of the e-book, such as N=300. In FIGS. 2, 1, 6, 11, N/4 (=75), N/3 (=100), and N/2 (=150) represent the numbers of pages to be flipped for the respective regions. The corresponding information is stored in the mapping table. When the touched position is located in the first region on the top of the touch panel, that is, the first region is touched once, it is determined that 150 pages are flipped at one time in response to the touching of the first region according to the information in the mapping table. When the touched position is located in the second region on the top of the touch panel, that is, the second region is touched once, it is determined that 100 pages are flipped at one time in response to the touching of the second region according to the information in the mapping table. In another embodiment, the corresponding information may be stored in a lookup table. In further another embodiment, an equation is built to calculate the corresponding information of the regions and the numbers of pages to be flipped, such as $M=N/K^2$, wherein N represents the total number of pages of the e-book, K represents the K-th region among the equally divided regions, and M represents the number of pages to be flipped for the K-th region. When the result value of $N/K^2$ is not an integer, M is obtained by retrieving a larger or smaller integer around the result value. For example, when the touched position is located in the second region, 75 pages will be flipped at one time according to the calculated result of the above equation. When the touched position is located in the third region, 33 pages will be flipped at one time according to the calculated result of the above equation. Note that, the present invention is not limited to the flipping operations of e-books. The method for flipping pages can be also applied to the technique which is performed to flip pages of electronic data in electronic devices, such as reviewing photographs taken on digital cameras. Moreover, FIG. 2 is only one possible embodiment of the invention. The number of divided regions can be determined according to users' usage habits, such as the 6 regions shown in FIG. 2, or 4 regions etc. The corresponding information stored in the mapping table or the lookup table may be default setting or determined by the user. Moreover, the form of the above equation can be set by one skilled in the art according to actual requirements, not limited to the provided embodiments.

Figure 3:
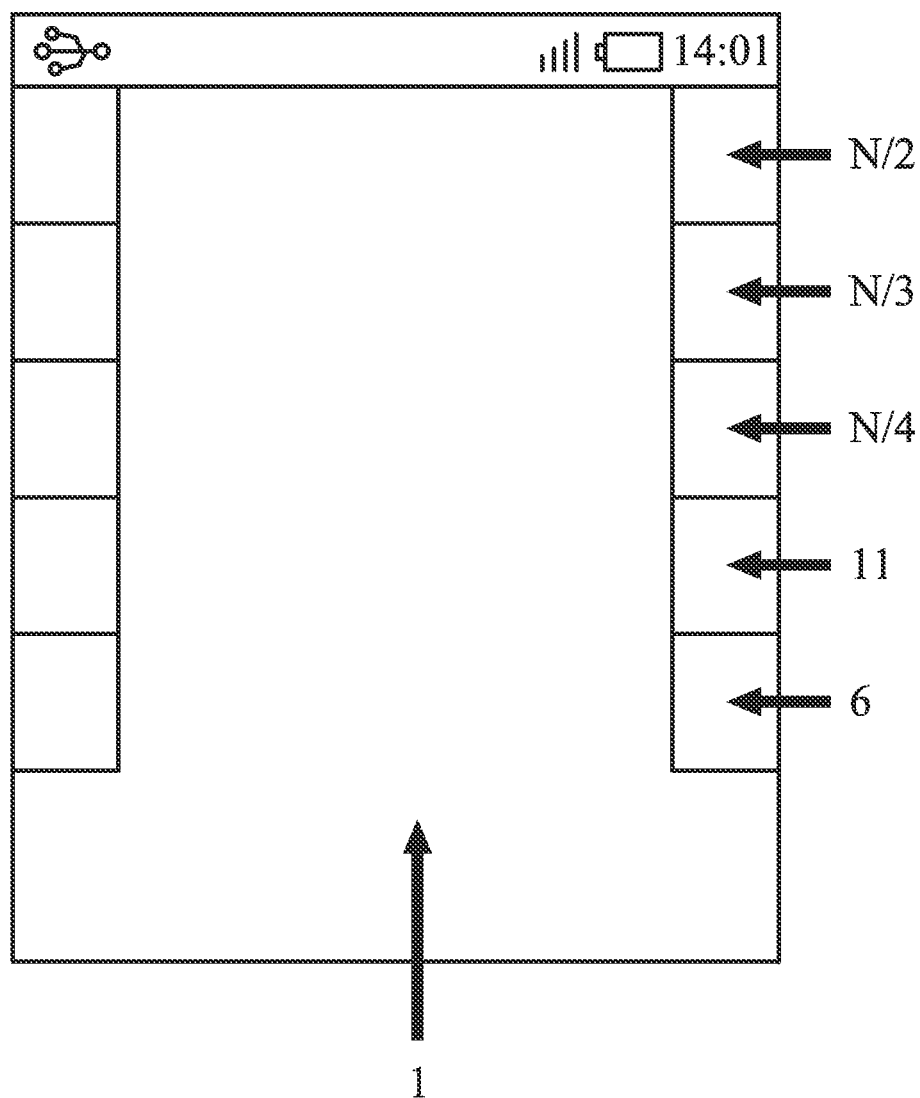
FIG. 3 is a schematic diagram illustrating a touch panel unequally divided into several regions according to an exemplary embodiment of the present invention.

In another embodiment, due to usage habits, the user may flip the pages of the fixed number at the maximum probability, such as flipping one page at one time. In order to maintain the usage habit of the user and make it convenient for the user, it is not limited to the touch panel being divided into several equal regions. The touch panel can be divided into several regions belonging to two portions. The regions in one portion each have the same area, while the regions in the other portion have different areas. FIG. 3 is a schematic diagram illustrating a touch panel unequally divided into several regions according to an exemplary embodiment of the present invention. As shown in FIG. 3, the number of pages to be flipped at the maximum probability is 1. The large region at the center of the touch panel serves as a region corresponding to the number of pages to be flipped being equal to 1. The small regions at the right and left sides of the touch panel serve as regions corresponding to the other numbers of pages to be flipped. Note that FIG. 3 is only one possible embodiment of the invention. The division of the unequal regions is not limited to the pattern shown in FIG. 3. The areas of the regions and the numbers of pages to be flipped corresponding to different areas of the regions can be determined by users according to their usage habits. The corresponding information is stored in the mapping table or lookup table or represented by an equation. All modifications and similar arrangements made by one skilled in the art according to the present invention are within the scope of the appended claims.

Note that, for signal processing, one skilled in the art will know that the touched-point coordinates and the touched positions on the touch panel correspond to each other. In other words, the touch panel is an aggregate of the several touched-point coordinates. Thus, dividing the touch panel into several regions in the above embodiments can be interpreted as presetting several touched-point coordinate regions. As shown in FIGS. 2 and 3, several touched-point coordinate regions with the same area are pre-set, or some touched-point coordinate regions with the same area and some touched-point coordinate regions with different areas are pre-set. When the touched-point coordinate is located in one of the touched-point coordinate regions, the number of pages to be flipped is determined for the one touched-point coordinate region according to the rule defined in the above mapping table, lookup table, or equation.

Figure 4:
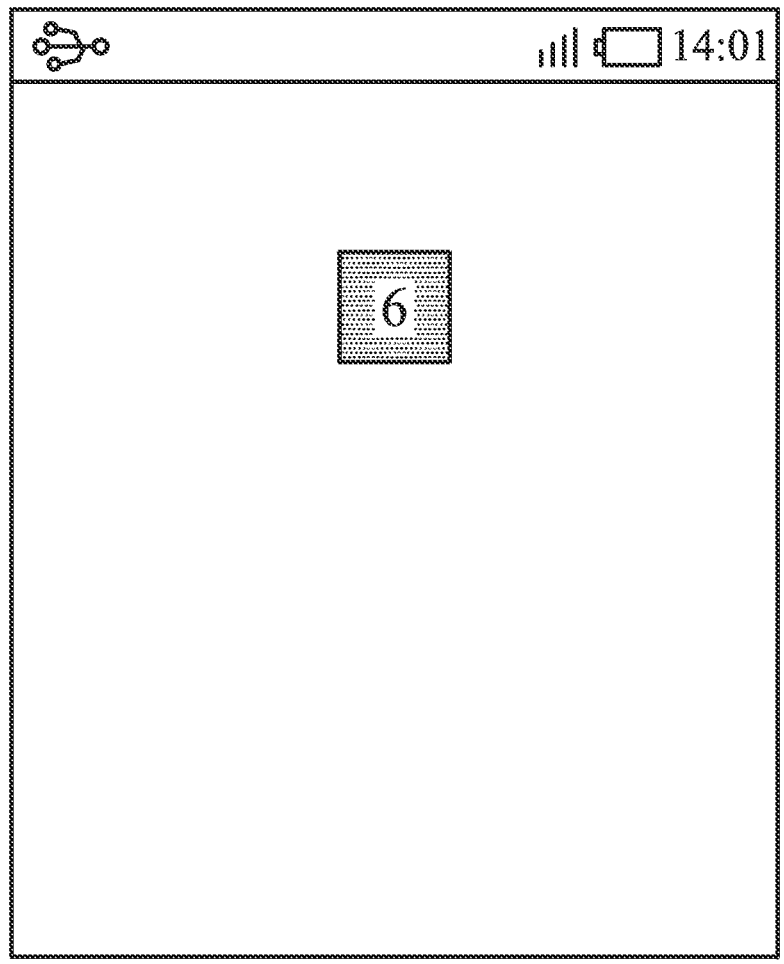
FIG. 4 is a schematic diagram illustrating the number of pages to be flipped corresponding to the region in which the touched position or touched-point coordinate is located is shown according to an exemplary embodiment of the present invention.

To determine the number of pages to be flipped more accurately, in some embodiments, the numbers of pages to be flipped are shown in the corresponding divided regions. In some other embodiments, only the number of pages to be flipped corresponding to the region in which the touched position or touched-point coordinate is located is shown. FIG. 4 is a schematic diagram illustrating the number of pages to be flipped corresponding to the region in which the touched position or touched-point coordinate is located is shown according to an exemplary embodiment of the present invention. One skilled in the art will be aware that "Toast" is a pop-up message block for prompting users in a friendly manner, such as showing that the data is stored successfully. In some embodiments, the numbers of pages to be flipped can be shown by the form of "Toast". As shown in FIG. 4, when the finger of a user touches the top region on the touch panel, a display module under the touch panel pops a "Toast" to show how many pages will be flipped in response to the touched region (the number of pages to be flipped is equal to 6 in FIG. 4), which is helpful for the user to locate the touched position. Note that FIG. 4 is only one possible embodiment of the invention. The way to show the number of pages to be flipped is not limited to "Toast" in FIG. 4. For the way to show the number of pages to be flipped, all modifications and similar arrangements made by one skilled in the art according to the present invention are within the scope of the appended claims.

Figure 5:
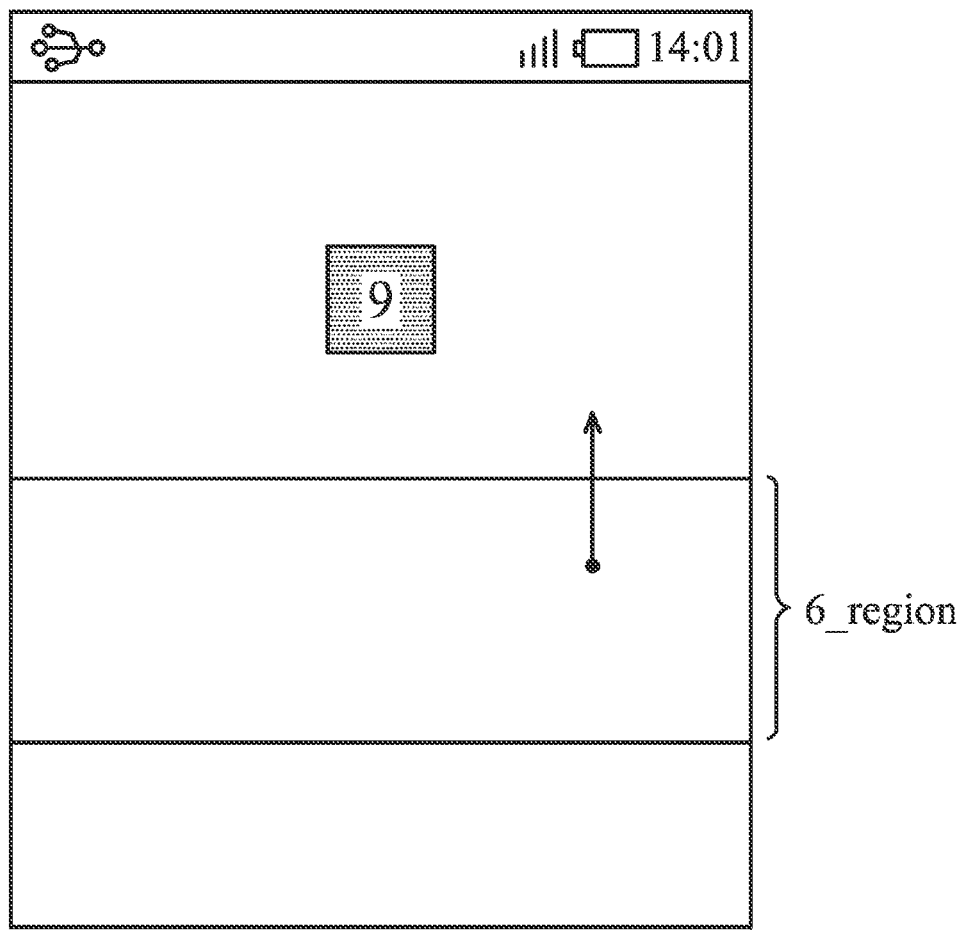
FIG. 5 is a schematic diagram illustrating the number of pages to be flipped is shown dynamically after the touched position or touched-point coordinate is changed continuously according to an exemplary embodiment of the present invention.

In some embodiments, to achieve the page flipping accurately, users can perform continuous touching, such as sliding, to change the touched position or touched-point coordinate for dynamically updating the number of pages to be flipped corresponding to the touched position or touched-point coordinate. In other words, users can continuously change the touched position, and the number of pages to be flipped can be dynamically changed according to the distance by which the touched position or touched-point coordinate is changed. Further, the changed number of pages to be flipped can be shown. FIG. 5 is a schematic diagram illustrating the number of pages to be flipped is shown dynamically after the touched position or touched-point coordinate is changed continuously according to an exemplary embodiment of the present invention. As shown in FIG. 5, it is assumed that the initial position touched by the user is the region whose corresponding number of pages to be flipped is equal to 6 (that is the region "6 region" labeled in FIG. 5). The number of pages to be flipped can be dynamically changed by continuously changing the touched position (for example, the user slides a finger upward and/or downward on the touch panel). There is a specified relationship between the changed number and the distance by which the touched position is changed (such as the distance by which the finger slides upward or downward). Moreover, to gently prompt the user, the changed number of pages to be flipped can be synchronously shown to the user by using the "Toast". As shown in FIG. 5, after the user slides his finger in a specified direction on the touch panel, the shown current number of pages to be flipped is equal to 9. Note that one skilled in the art would acknowledge that the relationship between the distance by which the touched position or touched-point coordinate is changed and the change in the number of pages to be flipped can be adjusted according to actual requirements or set by the user. Moreover, the relationship between the direction by which the touched position or touched-point coordinate is changed and the change in the number of pages to be flipped can be adjusted according to actual requirements or set by the user. For example, one skilled in the art would acknowledge that the upward changing of the touched position can be set for the increment of the number of pages to be flipped and the downward changing of the touched position can be set for the decrement of the number of pages to be flipped or that the leftward changing of the touched position can be set for the increment of the number of pages to be flipped and the rightward changing of the touched position can be set for the decrement of the number of pages to be flipped.

In some embodiments, the direction of the page flipping can initially be a forward direction or backward direction. In some other embodiments, when the touch panel is touched for the first time and then the touched position is continuously changed, after the forward or backward page flipping is performed, the data is shown according to the direction by which the touched position is changed. For example, sliding from the left side to the right side on the touch panel represents flipping pages forward, and sliding from the right side to the left side on the touch panel represents flipping pages backward. One skilled in the art would acknowledge that the sliding direction is set to correspond to the forward direction or backward direction according to actual requirements.

According to the method for flipping pages of present invention, in one embodiment, the sliding upward and/or downward which occurs after the touched panel is touched is set for the adjustment of the number of pages to be flipped, and the sliding rightward and/or leftward which occurs after the touched panel is touched is set for the adjustment of the direction of the page flipping. In this setting, after a user touches an e-book, the user can slide a finger upward and/or downward to adjust the number of pages to be flipped and then slide the finger rightward and/or leftward to achieve the page flipping.

Note that, in some embodiments, the division boundaries of the regions (touched-point coordinate regions) can be hidden. Users are not aware of the existence of the division boundaries through visual sense. For example, the division boundaries of the regions on the touch panel are not shown. Only when the finger of a user ouches the touch panel of the electronic device. "Toast" is popped up to show the number of pages to be flipped corresponding to the region in which the touched position or touched-point coordinate region is located. Accordingly, a confusing display on the screen induced by existence of division boundaries does not occur, and the visual experience of the user is thus not affected disadvantageously. In some other embodiments, the division boundaries of the regions may be shown in a highlight or lowlight to help users to determine the number of pages to be flipped more accurately. The division boundaries of the regions may be shown by solid lines or dotted lines, by straight lines or curves, or by other means. For example, the respective regions are colored by different colors, or the brightness values of the respective regions have different degrees. For the existence of the division boundaries, all modifications and similar arrangements made by one skilled in the art according to the present invention are within the scope of the appended claims.

Figure 6:
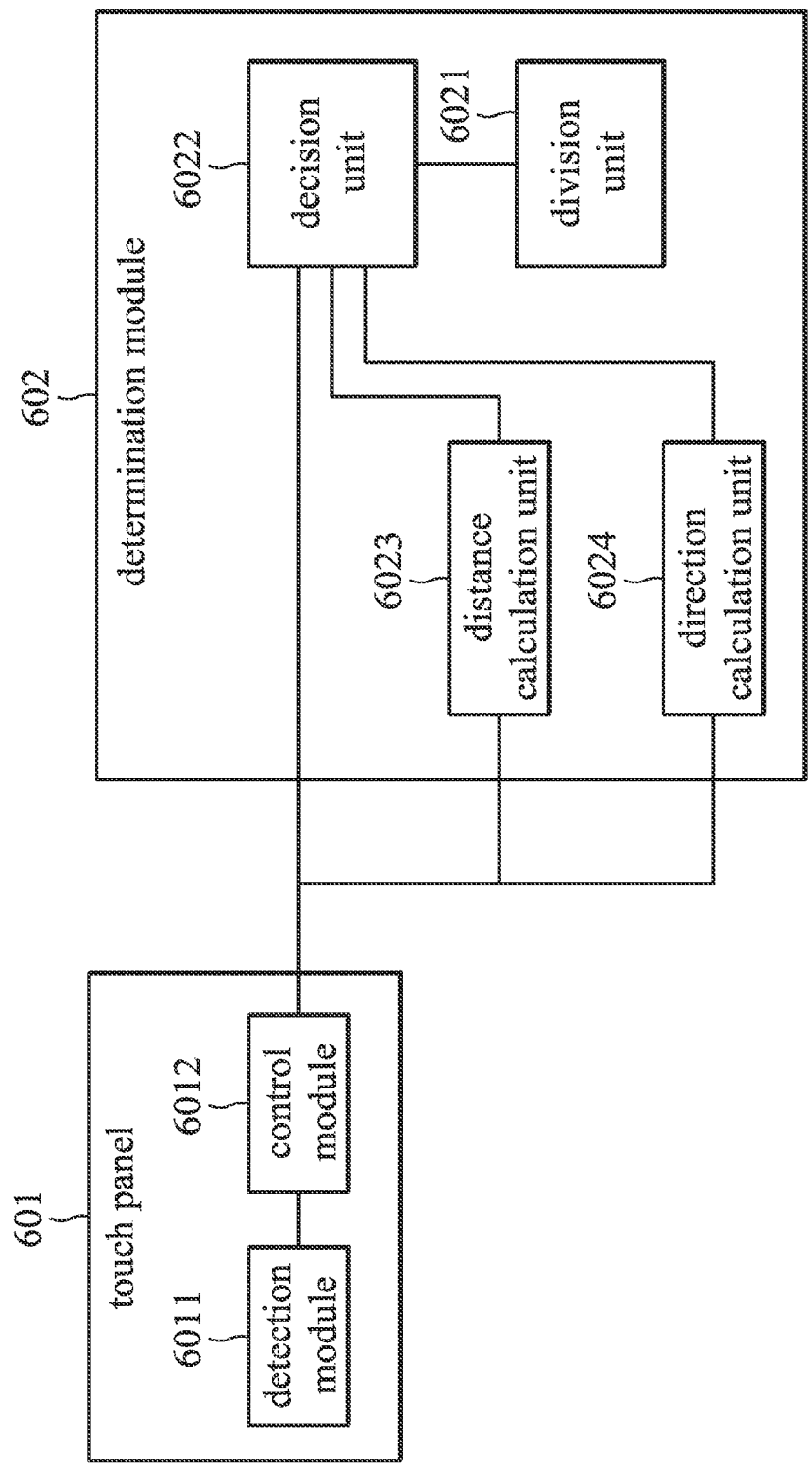
FIG. 6 is a block diagram illustrating a device for flipping pages of electronic data applied to a touch panel according to an exemplary embodiment of the present invention.

FIG. 6 is a block diagram illustrating a device for flipping pages of electronic data according to an exemplary embodiment of the present invention. As shown in FIG. 6, the device comprises a touch panel 601 and a determination module 602. The determination module 602 is coupled to the touch panel 601. The determination module 602 is configured to determine the number of pages of electronic data to be flipped when the touch panel 601 is touched by a user. For example, in an embodiment, the touch panel 601 comprises a detection module 6011 and a control module 6012. The detection module 6011 is configured to detect the position touched by the user and transmit a detection signal to the control module 6012 according to the detection result. The control module 6012 transfers the detection signal from the detection module 6011 to a touched-point coordinate signal and then transmits the touched-point coordinate signal to the determination module 602.

In some embodiments, the determination module 602 comprises a division unit 6021 and a decision unit 6022. The division unit 6021 is configured to divide the touch panel into several regions, wherein each region corresponds to a different number of pages to be flipped. The decision unit 6022 is coupled to the division unit 6021. When the touched position is located in one of the regions, the decision unit 6022 is configured to determine the number of pages to be flipped for the region in which the touched position is located. In some embodiments, the division unit 6021 can divide the touch panel into several regions as shown in FIG. 2. In some other embodiments, according to the usage habits of the user, the user may flip the pages of the fixed number at the maximum probability, such as flipping one page at one time. In order to maintain the usage habit of the user and make it convenient for the user, the division unit 6021 is not limited to dividing the touch panel into several equal regions. The division unit 6021 can divide the touch panel into several regions belonging to two portions. The regions in one portion have the same area, while the regions in the other portion have different areas. If the number of pages to be flipped at the maximum probability is 1, the division unit 6021 can get the large region at the center of the touch panel to serve as a region corresponding to the number of pages to be flipped being equal to 1, and get the small regions at the right and left sides of the touch panel to serve as the regions corresponding to the other numbers of pages to be flipped, as shown in FIG. 3. Alternatively, when the touch panel is divided into several regions, the region, which corresponds to the number of pages to be flipped being equal to 1, has the largest area among the several regions.

When the device for flipping pages is applied to e-books, the number of pages to be flipped can be determined according to the predetermined rule of the region division and the number of pages to be flipped shown in FIG. 2 or FIG. 3. For clarity, the related description is omitted. Note that the present invention is not limited to the flipping operation of e-books. The device for flipping pages can be also applied to the technique which is performed to flip pages of electronic data, such as reviewing photographs taken on digital cameras. Moreover, FIGS. 2 and 3 are only possible embodiments of the invention. The division unit 6021 can set the number of the divided regions and the areas of the divided regions according to the user's usage habits. For setting of the number of the divided regions and the areas of the divided regions, all modifications and similar arrangements made by one skilled in the art according to the present invention are within the scope of the appended claims.

In some embodiments, to achieve the page flipping accurately, the determination module 602 further comprises a distance calculation unit 6023 which is coupled to the touch panel 601. When a user performs continuous touching, such as sliding, that is when the touched position is changed continuously, the distance calculation unit 6023 is configured to calculate the distance by Which the touched position is changed. The decision unit 6022 determines the number of pages to be flipped according to the touched position and the distance by which the touched position is changed. As shown in FIG. 5, when the user slides a finger upward by a specified distance on the touch panel, the decision unit 6022 determines that the number of pages to be flipped is changed to 9 from 6. Note that, one skilled in the art would acknowledge that the relationship between the distance by which the touched position is changed and the change in the number of pages to be flipped can be default setting or set by the user. In some embodiments, the direction of the page flipping can be a forward direction or backward direction. In some other embodiments, the determination module 602 further comprises a direction calculation unit 6024 which is coupled to the touch panel 601. When the touched position is change continuously, the direction calculation unit 6024 calculates the direction by which the touched position is changed. The decision unit 6022 determines that the direction of the page flipping is a forward direction or a backward direction, according to the calculated direction. Note that the relationship between the direction by which the touched position is changed and the change in the number of pages to be flipped can be adjusted according to actual requirements or set by the user. For example, one skilled in the art would acknowledge the upward changing of the touched position can be set for the forward page flipping and the downward changing of the touched position can be set for the backward page flipping or that the leftward changing of the touched position can be set for the forward page flipping and the rightward changing of the touched position can be set for the backward page flipping.

Figure 7:
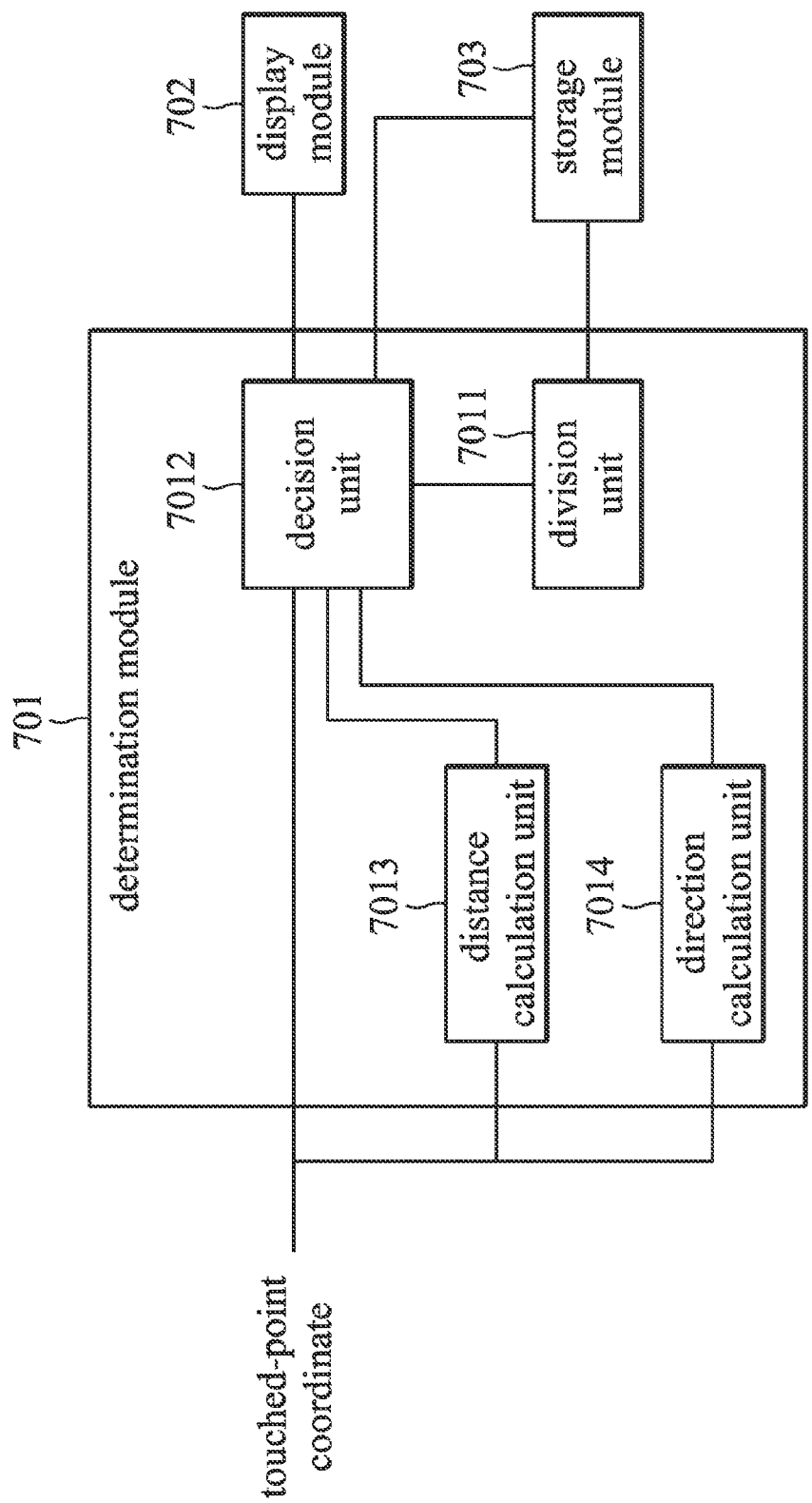
FIG. 7 is a block diagram illustrating a device for flipping pages of electronic data according to another exemplary embodiment of the present invention.

FIG. 7 is a block diagram illustrating a device for flipping pages of electronic data according to another exemplary embodiment of the present invention. As shown in FIG. 7, the device comprises a determination module 701 and a display module 702. The determination module 701 receives the touched-point coordinate signal generated from the touch panel 601 of FIG. 6. The determination module 701 is configured to determine the number of pages of electronic data to be flipped according to the touched-point coordinate signal. The display module 702 is coupled to the determination module 701 and configured to display the electronic data after the page flipping is performed according to the determined number of pages to be flipped.

In some embodiments, the determination module 701 comprises a division unit 7011 and a decision unit 7012. The division unit 7011 is configured to pre-set several touched-point coordinate regions. The decision unit 7012 is coupled to the division unit 7011. When the touched-point coordinate is located in one of the touched-point coordinate regions, the decision unit 7012 is configured to determine the number of pages to be flipped for the region in which the touched-point coordinate is located, according to the predefined rule. The predefined rule may be defined in the mapping table, lookup table, or equation described in the embodiments of FIGS. 2 and 3. The display module 702 displays the electronic data after the page flipping is performed according to the number of pages to be flipped, which is determined by the decision unit 7012. In some embodiments, the division unit 7011 can pre-set the touched-point coordinate regions having the same area, as shown in FIG. 2. In some other embodiments, according to the usage habits of the user, the user may flip the pages of the fixed number at the maximum probability, such as flipping one page at one time. In order to maintain the usage habits of the user and make it convenient for the user, the division unit 7011 is not limited to pre-set the equal touched-point coordinate regions. The division unit 7011 can pre-set several touched-point coordinate regions belonging to two portions. The touched-point coordinate regions in one portion have the same area, while the touched-point coordinate regions in the other portion have different areas. If the number of pages to be flipped at the maximum probability is 1, the division unit 7011 can get the large touched-point coordinate region at the center of the touch panel to serve as a region corresponding to the number of pages to be flipped being equal to 1, and get the small touched-point coordinate regions at the right and left sides of the touch panel to serve as the regions corresponding to the other numbers of pages to be flipped, as shown in FIG. 3. Alternatively, when there are several pre-set touched-point coordinate regions, the touched-point coordinate region that corresponds to the number of pages to be flipped being equal to 1, has the largest area among the several touched-point coordinate regions. FIGS. 2 and 3 are only possible embodiments of the invention. The division unit 7011 can set the number of touched-point coordinate regions and the areas of the touched-point coordinate regions according to the user's usage habits. For the setting of the touched-point coordinate regions and the areas of the touched-point coordinate regions, all modifications and similar arrangements made by one skilled in the art according to the present invention are within the scope of the appended claims.

To determine the number of pages to be flipped more accurately, in some embodiments, the display module 702 shows the number of pages to be flipped in the corresponding touched-point coordinate regions. In some other embodiments, the display module 702 shows only the number of pages to be flipped corresponding to the region in which the touched-point coordinate is located. As shown in FIG. 4, the number of pages to be flipped corresponding to the region in which the touched-point coordinate is located is shown by the form of "Toast". Note that FIG. 4 is only one possible embodiment of the invention. The way to show the number of pages to be flipped is not limited to "Toast" in FIG. 4. For the way to show the number of pages to be flipped, all modifications and similar arrangements made by one skilled in the art according to the present invention are within the scope of the appended claims.

In some embodiments, to achieve the page flipping accurately, the determination module 701 further comprises a distance calculation unit 7013, which is configured to receive the touched-point coordinate. When the touched-point coordinate is changed continuously, the distance calculation unit 7013 is configured to calculate the distance by which the touched-point coordinate is changed. The decision unit 7012 determines the number of pages to be flipped according to the touched-point coordinate and the distance by which the touched-point coordinate is changed. As shown in FIG. 5, when the user slides a finger upward by a specified distance on the touch panel, the number of pages to be flipped, which is shown by the display module 702, is changed to 9 from 6.

Note that one skilled in the art would acknowledge that the relationship between the distance by which the touched-point coordinate is changed and the change in the number of pages to be flipped can be default setting or set by the user. In some embodiments, the direction of the page flipping can be a forward direction or backward direction. In some other embodiments, the determination module 701 further comprises a direction calculation unit 7014 which is configured to receive the touched-point coordinate. When the touched-point coordinate is changed continuously, the direction calculation unit 7014 calculates the direction by which the touched-point coordinate is changed. The decision unit 7012 determines that the direction of the page flipping is a forward direction or backward direction according to the calculated direction. Note that the relationship between the direction by which the touched-point coordinate is changed and the change in the number of pages to be flipped can be adjusted according to actual requirements or set by the user. For example, one skilled in the art would acknowledge that the upward changing of the touched-point coordinate can be set for the forward page flipping and the downward changing of the touched-point coordinate can be set for the backward page flipping or that the leftward changing of the touched-point coordinate can be set for the forward page flipping and the rightward changing of the touched-point coordinate can be set for the backward page flipping.

Note that, in some embodiments, the division boundaries of the touched-point coordinate regions, which are pre-set by the division unit 7011, are hidden on the display module 702. Users are not aware of the existence of the division boundaries through visual sense. In some other embodiments, the division boundaries may be shown in a highlight or lowlight on the display module 702 to help users to determine the number of pages to be flipped more accurately. One skilled in the art will understand that the sliding direction is set to correspond to the forward direction or backward direction according to the actual requirements.

The device for flipping pages of electronic data of FIG. 7 may further comprise a storage module 703 which is coupled to the division unit 7011 and the decision unit 7012 of the determination module 701. The storage module 703 is configured to store the information of the region division set by the division unit 7011, such as several pre-set touched-point coordinate regions having equal or unequal areas. The storage module 703 is configured to further store the mapping table, lookup table, or equation described in the embodiments of FIGS. 2 and 3. The predefined rule, which is used for the decision unit 7012 to determine the numbers of pages to be flipped for the respective regions, is the information of the page flipping corresponding to the respective regions represented by the mapping table, lookup table, or equation. In other words, the predefined rule may be defined in the mapping table, lookup table, or equation described in the embodiments of FIGS. 2 and 3. For example, in some embodiments, the division unit 7011 stores the information of the region division into the storage module 703. The decision unit 7012 can read the information of the region division and the numbers of pages to be flipped for the respective regions from the storage module 703 to determine the number of pages to be flipped for the region in which the touched-point coordinate is located. Moreover, the storage module 703 may further store the information of the relationship between the distance by which the touched-point coordinate is changed and the change in the number of pages to be flipped and the information of the relationship between the direction by which the touched-point coordinate is changed and the forward or backward page flipping for the decision unit 7012. The decision unit 7012 determines the number of pages to be flipped and/or the direction of the page flipping according to the above information of the relationship and the distance and/or the direction provided by the distance calculation unit 7013 and/or the direction calculation unit 7014. Note that the information stored in the storage module 703 can be set initially or set by the user, and the storage module 703 can be disposed inside or outside of the determination module 701. For the setting of the information stored in the storage module 703 and the disposition of the storage module 703, all modifications and similar arrangements made by one skilled in the art according to the present invention are within the scope of the appended claims. Moreover, the storage module 703 shown in FIG. 7 can be applied in the device of flipping pages of electronic data shown in FIG. 6. For the application of the storage module 703, all modifications and similar arrangements made by one skilled in the art according to the present invention are within the scope of the appended claims.

As the above description, the method and device for flipping pages of electronic data and the electronic apparatus using the same, the number of pages to be flipped is determined according to the touched position or touched-point coordinate. Thus, a user can achieve the page flipping with different numbers of pages to be flipped by performing the touch operation once. Moreover, the operation for achieving the page flipping function is simple. For example, the page flipping is accomplished just by touching the touch panel, or the page flipping is accomplished by touching the touch panel and then sliding a finger of the user on the touch panel rightward and leftward, or the page flipping is accomplished by touching the touch panel, sliding a finger of the user on the touch panel upward and downward to adjust the number of pages to be flipped, and then sliding the finger of the user on the touch panel rightward and leftward. According to the method for flipping pages of electronic data in the embodiments of the present invention, complex user interfaces, such as function tables, menus and/or pop-up message blocks, are not adopted. On the contrary, the simple and convenient operation of flipping multiple pages is adopted, like flipping pages of substantial books in the method for flipping pages of electronic data in the embodiments of the present invention, avoiding the complex and mechanized operation of using function tables, menus and/or pop-up message blocks and selecting items thereon.

In the embodiments of the present invention, the device for flipping pages of electronic data shown in FIG. 6 can be applied in an electronic apparatus for performing the control of page flipping on electronic data displayed on the electronic apparatus. In some other embodiments of the present invention, the device for flipping pages of electronic data shown in FIG. 7 can be applied in another electronic apparatus for performing the control of page flipping on electronic data displayed on the electronic apparatus. The said electronic apparatuses can be mobile phones, e-book readers, electronic dictionaries, digital cameras, or tablet computers etc., however, without limitations for the present invention. All modifications and similar arrangements made by one skilled in the art according to the present invention are within the scope of the appended claims.

One skilled in the art will understand that the embodiments of the present ion can be provided as methods, systems, or computer products. Accordingly, the present invention can be accomplished by embodiments fully having hardware, embodiments fully having software, or embodiments having a combination of hardware and software. Moreover, the present invention can take a form which can be performed in one or more computer program products having a computer-usable storage medium (including disc memory, CD-ROM, and optical memory, however without limitation) storing computer-usable program codes. For example, when the present invention is be accomplished by embodiments fully having software, the determination module, the division module, and the decision unit in the above embodiments can be implemented by general purpose computers, special purpose computers, embedded computers, or other processors which can program data processing apparatuses.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for flipping pages of electronic data based on a touch panel, comprising:
   detecting a touched position when the touch panel is touched;
   dividing the touch panel into a plurality of regions, wherein each of the plurality of regions corresponds to the different numbers of pages to be flipped; and
   when the touched position is located in one of the plurality of regions, determining the number of pages to be flipped corresponding to the region in which the touched position is located.

2. The method for flipping pages of electronic data as claimed in claim 1 wherein the step of dividing the touch panel into the plurality of regions comprises:
   dividing the touch panel into the plurality of regions with the same area, or dividing the touch panel into the plurality of regions belonging to two portions among which the regions in one portion have the same area and the regions in the other portion have different areas.

3. The method for flipping pages of electronic data as claimed in claim 2, wherein when the touch panel is divided into the plurality of regions belonging to two portions among which the regions in one portion have the same area and the regions in the other portion have different areas, the region which corresponds to the number of pages to be flipped, used at the maximum probability, has the largest area.

4. The method for flipping pages of electronic data as claimed in claim 1 further comprising:
   when the touched position is changed continuously, calculating distance by which the touched position is changed and determining the number of pages to be flipped according to the calculated distance.

5. The method for flipping pages of electronic data as claimed in claim 1 further comprising:
   when the touched position is changed continuously, calculating a direction by which the touched position is changed and determining that direction of page flipping is a forward or a backward direction according to the calculated direction.

6. A method for flipping pages of electronic data comprising:
   receiving a touched-point coordinate signal, wherein the touched-point coordinate signal corresponds to a touched-point coordinate;
   pre-setting a plurality of touched-point coordinate regions;
   when the touched-point coordinate is located in one of the plurality of touched-point coordinate regions, determining the number of pages to be flipped corresponding to the region in which the touched-point coordinate is located according to a predefined rule; and displaying the electronic data after page flipping is performed according to the determined number of pages to be flipped.

7. The method for flipping pages of electronic data as claimed in claim 6, wherein the predefined rule is defined in a mapping table, a lookup table, or an equation.

8. The method for flipping pages of electronic data as claimed in claim 6, wherein the plurality of touched-point coordinate regions are pre-set with the same area, or the plurality of touched-point coordinate regions belong to two portions among which the touched-point coordinate regions in one portion have the same area and the touched-point coordinate regions in the other portion have different areas.

9. The method for flipping pages of electronic data as claimed in claim 6 further comprising:

showing the corresponding number of pages to be flipped in each of the plurality of touched-point coordinate regions or showing the number of pages to be flipped corresponding to the touched-point coordinate region in which the touched-point coordinate is located.

10. The method for flipping pages of electronic data as claimed in claim 9, wherein the step of showing the number of pages to be flipped corresponding to the touched-point coordinate region in which the touched-point coordinate is located comprises:

when the touched-point coordinate is changed continuously, calculating a distance by which the touched-point coordinate is changed and dynamically showing the number of pages to be flipped according to the calculated distance.

11. The method for flipping pages of electronic data as claimed in claim 6 further comprising:

when the touched-point coordinate is changed continuously, calculating a direction by which the touched-point coordinate is changed and displaying the electronic data after page flipping is performed forward or backward, according to the calculated direction.

12. A device for flipping pages of electronic data based on a touch panel, comprising:

a detection module for detecting a touched position when the touch panel is touched; and a determination module, coupled to the detection module, for determining the number of pages of electronic data to be flipped according to the touched position, wherein the determination module comprises:

a division unit for dividing the touch panel into a plurality of regions, wherein each of the plurality of regions corresponds to the different numbers of pages to be flipped; and a decision unit, wherein when the touched position is located in one of the plurality of regions, the decision unit determines the number of pages to be flipped corresponding to the region in which the touched position is located.

13. The device for flipping pages of electronic data as claimed in claim 12, wherein the division unit divides the touch panel into the plurality of regions with the same area, or divides the touch panel into the plurality of regions belonging to two portions among which the regions in one portion have the same area and the regions in the other portion have different areas.

14. The device for flipping pages of electronic data as claimed in claim 13, wherein when the division unit divides the touch panel into the plurality of regions belonging to two portions among which the regions in one portion have the same area and the regions in the other portion have different areas, the region which corresponds to the number of pages to be flipped used at the maximum probability has the largest area.

15. The device for flipping pages of electronic data as claimed in claim 12 wherein the determination module further comprises:

a distance calculation unit, wherein when the touched position is changed continuously, the distance calculation unit calculates distance by which the touched position is changed, and the decision unit determines the number of pages to be flipped according to the calculated distance.

16. The device for flipping pages of electronic data as claimed in claim 12, wherein the determination module further comprises:

a direction calculation unit, wherein when the touched position is changed continuously, the direction calculation unit calculates a direction by which the touched position changed, and the decision unit determines that direction of page flipping is a forward or a backward direction according to the calculated direction.

17. An electronic apparatus comprising:

a device for flipping pages of electronic data based on a touch panel, as claimed in claim 12, for performing page flipping to the electronic data of the electronic apparatus.

18. A device for flipping pages of electronic data comprising:

a determination module for receiving a touched-point coordinate signal and determining the number of pages of electronic data to be flipped according to the touched-point coordinate, wherein the touched-point coordinate signal corresponds to a touched-point coordinate; and a display module for displaying the electronic data after page flipping is performed according to the determined number of pages to be flipped, wherein the determination module comprises:

a division unit for pre-setting a plurality of touched-point coordinate regions; and a decision unit, where when the touched-point coordinate is located in one of the plurality of touched-point coordinate regions, the decision unit determines the number of pages to be flipped corresponding to the region in which the touched-point coordinate is located according to a predefined rule.

19. The device for flipping pages of electronic data as claimed in claim 18, wherein the predefined rule is defined in a mapping table, a lookup table, or an equation.

20. The device for flipping pages of electronic data as claimed in claim 18, wherein the division unit pre-sets the plurality of touched-point coordinate regions having the same area, or pre-sets the plurality of touched-point coordinate regions belonging to two portions among which the touched-point coordinate regions in one portion have the same area and the touched-point coordinate regions in the other portion have different areas.

21. The device flipping pages of electronic data as claimed in claim 18, wherein the display module shows the corresponding number of pages to be flipped in each of the plurality of touched-point coordinate regions, or shows the number of pages to be flipped corresponding to the touched-point coordinate region in which the touched-point coordinate is located.

22. The device for flipping pages of electronic data as claimed in claim 21, wherein the determination module further comprises:

a distance calculation unit, wherein when the touched-point coordinate is changed continuously, the distance calculation unit calculates a distance by which the touched-point coordinate is changed, the decision unit determines the number of pages to be flipped according to the calculated distance, and the display unit dynamically shows the number of pages to be flipped.

23. The device for flipping pages of electronic data as claimed in claim 18, the determination module further comprising:
a direction calculation unit, wherein when the touched-point coordinate is changed continuously, the direction calculation unit calculates a direction by which the touched-point coordinate is changed, the decision unit determines that direction of page flipping is forward or backward direction according to the calculated direction, and the display module displays the electronic data after page flipping is performed.

24. An electronic apparatus comprising:
a device for flipping pages of electronic data, as claimed in claim 18, for performing page flipping to the electronic data of the electronic apparatus.

* * * * *